(12) United States Patent
Lorenz et al.

(10) Patent No.: US 6,737,471 B2
(45) Date of Patent: May 18, 2004

(54) POLYURETHANE ELASTOMERS WHICH EXHIBIT IMPROVED STABILITY TO HYDROLYSIS

(75) Inventors: Klaus Lorenz, Dormagen (DE); Marc Schütze, Düsseldorf (DE); Erhard Michels, Köln (DE); Alexander Eckhardt, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/020,473

(22) Filed: Dec. 14, 2001

(65) Prior Publication Data

US 2002/0120027 A1 Aug. 29, 2002

(30) Foreign Application Priority Data

Dec. 20, 2000 (DE) .......................... 100 63 497

(51) Int. Cl.$^7$ .............. G08K 5/10; C08J 9/04; C08G 18/42
(52) U.S. Cl. .............. 524/773; 521/128; 521/129; 521/130; 521/159; 521/172; 521/173; 521/174; 524/284; 524/300; 524/306; 524/314; 524/315; 528/48; 528/49; 528/52; 528/53; 528/59; 528/60; 528/65; 528/66; 528/76; 528/80

(58) Field of Search .................. 521/128, 129, 521/130, 159, 172, 173, 174; 524/284, 300, 306, 314, 315, 773; 528/48, 49, 52, 53, 59, 60, 65, 66, 76, 80

(56) References Cited

U.S. PATENT DOCUMENTS

| 4,618,630 A | * | 10/1986 | Knobel et al. ............... 521/105 |
| 5,350,781 A | | 9/1994 | Liman et al. ................ 521/174 |
| 5,686,187 A | * | 11/1997 | Turnbach .................... 521/110 |

FOREIGN PATENT DOCUMENTS

| CA | 2309488 | 12/2000 |
| DE | 19838167 | 2/2000 |
| EP | 0 926 173 A1 | 6/1999 |
| EP | 0 982 336 | 3/2000 |
| WO | 00/11059 | 3/2000 |

* cited by examiner

*Primary Examiner*—Rabon Sergent
(74) *Attorney, Agent, or Firm*—Joseph C. Gil; Aron Preis; James R. Franks

(57) ABSTRACT

A solid and/or cellular polyurethane elastomers which are produced using polyester polyols are disclosed. The elastomers which exhibit improved stability to hydrolysis are characterized in that their preparation is carried out in the presence of at least one esters of monobasic carboxylic acid or polybasic carboxylic acids, the (first) dissociation constant (pK) of which is 0.5 to 4.

8 Claims, No Drawings

POLYURETHANE ELASTOMERS WHICH EXHIBIT IMPROVED STABILITY TO HYDROLYSIS

FIELD OF THE INVENTION

The present invention relates to solid and/or cellular polyurethane elastomers (PUR elastomers) which are produced using polyester polyols and which exhibit improved stability to hydrolysis, and to methods for the production thereof.

SUMMARY OF THE INVENTION

A solid and/or cellular polyurethane elastomers which are produced using polyester polyols are disclosed. The elastomers which exhibit improved stability to hydrolysis are characterized in that their preparation is carried out in the presence of at least one esters of monobasic carboxylic acid or polybasic carboxylic acids, the (first) dissociation constant (pK) of which is 0.5 to 4.

BACKGROUND OF THE INVENTION

Semi-rigid, elastic polyurethane moldings in solid or cellular form, i.e. in slightly foamed form, are often synthesized based on polyester-polyurethane materials. In order to improve the durability of these material in humid environments, i.e. under conditions which give rise to hydrolysis, EP-A 982 336 teaches that acids or acid derivatives should be admixed with the isocyanate component in order to effect blocking, by protonation, of the amines and of the amine catalysts which are possibly contained therein, which are released due to the hydrolysis of the polyisocyanate polyaddition product, and thus to prevent any further cleavage of the urethane bond. For this purpose, the acids or acid derivatives are used in a molar excess in relation to the amines contained in the mixture. DE-OS 198 38 167 proposes the use of acid anhydrides for the same purpose.

It has now been found that polyester-polyurethanes which are particularly stable to hydrolysis are obtained if esters of mono- or polybasic carboxylic acids, the (first) dissociation constant of which has a pK value of 0.5 to 4, are added in substoichiometric amounts to the polyurethane formulation.

DETAILED DESCRIPTION OF THE INVENTION

The present invention relates to polyurethane elastomers prepared by reacting a) di- and/or polyisocyanates with
b) at least one polyester polyol with an OH number of 20 to 280, preferably 28 to 150, and a functionality of 1 to 3, preferably 1.8 to 2.4, and optionally with
c) other polyether polyols or polyether ester polyols with OH numbers of 10 to 149 and functionalities of 2 to 8, and optionally with
d) low molecular weight chain extenders and/or crosslinking agents with OH numbers of 150 to 1870,
in the presence of
e) amine catalysts,
f) esters of mono- or polybasic carboxylic acids, the (first) dissociation constant (pK) of which is 0.5 to 4, preferably of 1 to 3, and optionally of
g) foaming agents, and optionally of
h) additives, wherein the maximum ratio of the number of ester groups in component f) to the number of amino groups in component e) is 1.0, preferably 0.5 to 0.8.

The PUR elastomers are preferably produced by the prepolymer method, wherein in the first step a polyaddition product which contains isocyanate groups is advantageously produced from at least part of the polyester polyol b) or from a mixture thereof with polyol component c) and at least one di- or polyisocyanate a). In the second step, solid PUR elastomers are produced by reacting the product obtained in the first step with low molecular weight chain extenders and/or crosslinking agents d) and/or with the remaining part of polyol components b) or c) or a mixture thereof. If water or other foaming agents, or mixtures thereof, are used in conjunction in the second step, microcellular PUR elastomers may be produced.

Suitable starting components a) for the method according to the invention are aliphatic, cycloaliphatic, araliphatic, aromatic and heterocyclic polyisocyanates. These are described, for example, by of W. Siefken in Justus Liebigs Annalen der Chemie, 562, pages 75 to 136; for example those of formula

$$Q(NCO)_n$$

wherein n=24, preferably 2, and Q denotes a aliphatic hydrocarbon radical containing 2–18, preferably 6–10 C atoms, a cycloaliphatic hydrocarbon radical containing 4–15, preferably 5–10 C atoms, an aromatic hydrocarbon radical containing 6–15, preferably 6–13 C atoms, or an araliphatic hydrocarbon radical containing 8–15, preferably 8–13 C atoms, e.g. ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane 1,3- and -1,4-diisocyanates and any mixtures of these isomers, 1-isocyanato-3,3,5-trimethyl-5-isocyanatomethyl-cyclohexane, 2,4- and 2,6-hexahydrotoluene diisocyanates and any mixtures of these isomers, hexahydro-1,3-and 1,4-phenylene diisocyanate, perhydro-2,4- and 4,4'-diphenylmethane diisocyanate, 1,3- and 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4- and 2,6-diisocyanates (TDI), and any mixtures of these isomers, diphenylmethane-2,4'- and/or -4,4'-diisocyanate (MDI), or naphthylene-1,5-iisocyanate (NDI).

Examples of other suitable isocyanates include triphenylmethane 4,4',4"-triisocyanate, polyphenyl-polymethylene polyisocyanates such as those which are obtained by aniline-formaldehyde condensation and subsequent phosgenation and which are described in GB-PS 874 430 and GB-PS 848 671 for example, m- and p-isocyanatophenylsulphonyl isocyanates according to U.S. Pat. No. 3,454,606, perchlorinated aryl polyisocyanates such as those described in U.S. Pat. No. 3,277,138, polyisocyanates which contain carbodiimide groups such as those described in U.S. Pat. No. 3,152,162 and in DE-OS 25 04 400, 25 37 685 and 25 52 350, norbornane diisocyanates according to U.S. Pat. No. 3,492,301, polyisocyanates comprising allophanate groups such as those described in GB-PS 994 890, BE-PS 761 626 and NL-A 7 102 524, polyisocyanates comprising isocyanurate groups such as those described in U.S. Pat. No. 3,001,9731, in DE-PS 10 22 789, 12 22 067 and 1 027 394 and in DE-OS 1 929 034 and 2 004 048, polyisocyanates comprising urethane groups such as those described in BE-PS 752 261 or in U.S. Pat. Nos. 3,394,164 and 3,644,457, polyisocyanates comprising acylated urea groups according to DE-PS 1 230 778, polyisocyanates comprising biuret groups such as those described in U.S. Pat. Nos. 3,124,605, 3,201,372 and 3,124,605 and in GB-PS 889 050, polyisocyanates produced by telomerisation reactions such as those described in U.S. Pat. No. 3,654,106, polyisocyanates comprising ester groups such as those cited in GB-PS 965 474 and 1 072 956, in U.S. Pat. No. 3,567,763 and in DE-PS 12 31 688, reaction products of the aforementioned isocyanates with acetals according to DE-PS 1 072 385, and polymeric polyisocyanates containing fatty acid esters according to U.S. Pat. No. 3,455,883, all of which are incorporated herein by reference.

It is also possible to use distillation residues which result from the industrial production of isocyanates and which are optionally dissolved in one or more of the aforementioned polyisocyanates. Moreover, it is possible to use any mixtures of the aforementioned polyisocyanates.

The polyisocyanates which are preferably used are those which are readily obtainable industrially, e.g. 2,4- and 2,6-toluene diisocyanate and any mixtures of these isomers ("TDI"), 4,4'-diphenylmethane diisocyanate, 2,4'-diphenylmethane diisocyanate, 2,2'-diphenylmethane diisocyanate and polyphenyl-polymethylene polyisocyanates, such as those which are produced by aniline-formaldehyde condensation and subsequent phosgenation ("crude MDI") and polyisocyanates which comprise carbodiimide groups, uretonimine groups, urethane groups, allophanate groups, isocyanurate groups, urea groups or biuret groups ("modified polyisocyanates"), particularly those modified polyisocyanates which are derived from toluene 2,4- and/or 2,6-diisocyanate or from 4,4'- and/or 2,4'-diphenylmethane diisocyanate. Naphthylene 1,5-diisocyanate and mixtures of the aforementioned polyisocyanates are also quite suitable.

The prepolymers which are most preferably used in the method according to the invention, however, are those which contain isocyanate groups which are produced by the reaction of at least a partial amount of polyester polyol b) or of at least a partial amount of a mixture of polyester polyol b), polyol component c) and/or chain extenders and/or crosslinking agents d) with at least one aromatic diisocyanate from the group comprising TDI, MDI, TODI, DIBDI, NDI, DDI, preferably with 4,4'-MDI and/or 2,4-TDI and/or 1.5-NDI to form a polyaddition product containing urethane groups and isocyanate groups which has an NCO content of 10 to 27% by weight, preferably 12 to 25% by weight.

As stated above, mixtures of b), c) and d) may be used for the production of the prepolymers which contain isocyanate groups. According to one preferred embodiment, however, the prepolymers which contain isocyanate groups are produced without chain extenders or crosslinking agents d).

The prepolymers which contain isocyanate groups may be produced in the presence of catalysts. It is also possible, however, to produce the prepolymers which contain isocyanate groups in the absence of catalysts and to add the latter to the reaction mixture for the production of the PUR elastomers only.

Suitable polyester polyols b) may be produced, for example, from organic dicarboxylic acids comprising 2 to 12 carbon atoms, preferably aliphatic dicarboxylic acids comprising 4 to 6 carbon atoms, and polyhydric alcohols, preferably diols, comprising 2 to 12 carbon atoms, preferably 2 to 6 carbon atoms. Examples of suitable dicarboxylic acids include: succinic acid, malonic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or in admixture with each other. Instead of the free dicarboxylic acids, the corresponding dicarboxylic acid derivatives, such as dicarboxylic acid mono and/or diesters of alcohols comprising 1 to 4 carbon atoms may be used, or dicarboxylic anhydrides may also be used. Mixtures of dicarboxylic acids comprising succinic, glutaric and adipic acids are preferably used, in quantitative ratios of 20 to 35/35 to 50/20 to 32 parts by weight for example, particularly adipic acid. Examples of di- and polyhydric alcohols include ethanediol, diethylene glycol, 1,2- and 1,3-propanediol, dipropylene glycol, 1,3-methylpropanediol, 1,4-butanediol, 1,5-pentanediol 1,6-hexanediol, neopentyl glycol, 1,10-decanediol, glycerol, trimethylolpropane and pentaerythritol. 1,2-ethanediol, diethylene glycol, 1,4-butanediol, 1,6-hexanediol, glycerol, trimethylol-propane or mixtures of at least two of the aforementioned diols are preferably used, particularly mixtures containing at least two of ethanediol, 1,4-butanediol and 1,6-hexanediol, glycerol and trimethylolpropane. In addition, polyester polyols of lactones, e.g. $\epsilon$-caprolactone, or hydroxycarboxylic acids, e.g. o-hydroxycaproic acid and hydroxyacetic acid, may be used.

For the production of the polyester polyols, organic polycarboxylic acids, e.g. aromatic or preferably aliphatic polycarboxylic acids and/or derivatives thereof, and polyhydric alcohols, may be polycondensed, in the absence of catalysts or in the presence of esterification catalysts, advantageously in an atmosphere of inert gases such as nitrogen, carbon monoxide, helium or argon, in solution or in the melt, at 150 to 300° C., preferably at 180 to 230° C., optionally under reduced pressure, to the desired acid number, which is advantageously less than 10 and is preferably less than 1.

According to a preferred method of production, the esterification mixture is polycondensed at the aforementioned temperatures to an acid number of 80 to 30, preferably 40 to 30, under normal pressure and is subsequently polycondensed under a pressure less than 500 mbar, preferably 10 to 150 mbar. Examples of suitable esterification catalysts include iron, cadmium, cobalt, lead, zinc, antimony, magnesium and tin catalysts in the form of metals, metal oxides or metal salts. Polycondensation may also be conducted, however, in a liquid phase in the presence of diluents or entraining agents such as benzene, toluene, xylene or chlorobenzene, for the removal by azeotropic distillation of the water of condensation.

For the production of the polyester polyols, the organic polycarboxylic acids and/or derivatives thereof are polycondensed with polyhydric alcohols, advantageously in a molar ratio of 1:1 to 1,8, preferably 1:1.05 to 1.2. The polyester polyols which are obtained preferably have a functionality of 1 to 3, particularly 1.8 to 2.4, and a number average molecular weight of 400 to 6000, preferably 800 to 3500.

Polycarbonates which comprise hydroxyl groups should also be cited as suitable polyester polyols. Suitable polycarbonates which comprise hydroxyl groups include those known in the art which may be produced, for example, by the reaction of diols such as 1,2-propanediol, 1,3-propanediol, 1,4-butanediol, 1,6-hexanediol, diethylene glycol, trioxyethylene glycol and/or tetraoxyethylene glycol with dialkyl carbonates or diaryl carbonates, e.g. diphenyl carbonate, or phosgene.

Difunctional polyester polyols with a number average molecular weight of 500 to 6000, preferably of 800 to 3500, and particularly of 1000 to 3300, are preferably used for the production of the elastomers according to the invention.

Polyether polyols and polyether ester polyols c) are optionally used for the production of the elastomers according to the invention. Polyether polyols may be produced by known methods, for example by the anionic polymerization of alkylene oxides in the presence of alkali hydroxides or alkali alcoholates as catalysts and with the addition of at least one starter molecule which contains 2 to 3 bonded, reactive hydrogen atoms, or by the cationic polymerization of alkylene oxides in the presence of Lewis acids such as antimony pentachloride or boron fluoride etherate. Suitable alkylene oxides contain 2 to 4 carbon atoms in their alkylene radical. Examples thereof include tetrahydrofuran, 1,2-propylene oxide and 1,2- or 2,3-butylene oxide. Ethylene oxide and/or 1,2-propylene oxide are preferably used. The alkylene oxides may be used individually, alternately in succession or as mixtures. Mixtures of 1,2-propylene oxide and ethylene oxide are preferably used, wherein the ethylene oxide is used in amounts of 10 to 50% as an ethylene oxide terminal block ("EO cap"), so that the resulting polyols contain more than 70% of primary OH terminal groups. Suitable starter molecules include water or di- and trihydric alcohols such as ethylene glycol, 1,2-propanediol and 1,3-propanediol, diethylene glycol, dipropylene glycol, 1,4-ethanediol, glycerol, trimethylolpropane, etc. Suitable polyether polyols have a functionality of 2 to 8, preferably 2 to 6, most preferably 2 to 4 and number average molecular weights of 500 to 8000, preferably 800 to 3500. Poly(oxypropylene-polyoxyethylene) polyols are preferably used.

Other suitable polyether polyols include polymer-modified polyether polyols, preferably graft polyether polyols, particularly those based on styrene and/or acrylonitrile which are produced by the in situ polymerization of acrylonitrile, styrene or preferably of mixtures of styrene and acrylonitrile, e.g. in a ratio by weight of 90:10 to 10:90, preferably 70:30 to 30:70 in the aforementioned polyether polyols, and also include polyether polyol dispersions which contain the following substances, for example, as a disperse phase, usually in an amount of 1 to 50% by weight, preferably 2 to 25% by weight: inorganic fillers, polyureas, polyhydrazides, polyurethanes which contain bonded tert.-amino groups and/or melamine.

Polyether ester polyols may also be added to improve the compatibility of the polyester polyol from b) and the polyether polyol of c). These polyether ester polyols are obtained by the propoxylation or ethoxylation of polyester polyols which preferably have a functionality of 1 to 3, particularly 1.8 to 2.4, and a number average molecular weight of 400 to 6000, preferably 800 to 3500.

For the production of the PUR elastomers according to the invention, low molecular weight difunctional chain extenders, tri- or tetra-functional crosslinking agents, or mixtures of chain extenders and crosslinking agents, may additionally be used as component d).

Chain extenders and crosslinking agents d) of this type are used for modifying the mechanical properties, particularly the hardness, of PUR elastomers. Suitable chain extenders such as alkanediols, dialkylene glycols and polyalkylene polyols, and crosslinking agents e.g. tri- or tetrahydric alcohols and oligomeric polyalkylene polyols with a functionality of 3 to 4, usually have molecular weights<800, preferably from 18 to 400, and particularly from 60 to 300. The chain extenders which are preferably used include alkanediols containing 2 to 12, preferably 2, 4 or 6 carbon atoms, e.g. ethanediol, 1,6-hexanediol, 1,7-heptanediol, 1,8-octanediol, 1,9-nonanediol, 1,10-decanediol and particularly 1,4-butanediol, and dialkylene glycols containing 4 to 8 carbon atoms, e.g. diethylene glycol and dipropylene glycol as well as polyoxyalkylene glycols. Other substances which are suitable here include branched chain and/or unsaturated alkanediols which usually contain not more than 12 carbon atoms, such as 1,2-propanediol, 2 methyl-1,3-propanediol, 2,2-dimethyl-1,3-propanediol, 2-butyl-2-ethyl-1,3-propanediol, 2-butene-1,4-diol and 2-butyne-1,4-diol, diesters of terephthalic acid with glycols comprising 2 to 4 carbon atoms, such as terephthalic acid-bis-ethylene glycol or terephthalic acid-bis- 1,4-butanediol, hydroxyalkylene ethers of hydroquinone or resorcinol, e.g. 1,4-di-(β-hydroxyethyl)-hydroquinone or 1,3-(β-hydroxyethyl)-resorcinol, alkanolamines comprising 2 to 12 carbon atoms such as ethanolamine, 2-aminopropanol and 3-amino-2,2-dimethylpropanol; N-alkyldialkanolamines, e.g. N-methyl- and N-ethyl-diethanolamines, (cyclo)aliphatic diamines comprising 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diamino dicyclohexylmethane; N-alkyl-, N,N'-dialkyl-substituted and aromatic diamines, which may also be substituted by alkyl groups on their aromatic radical, and comprising 1 to 20, preferably 1 to 4 carbon atoms in their N-alkyl radical, such as N,N'-diethyl-, N,N'-di-sec.-pentyl-, N,N'-di-sec.-hexyl-, N,N'-di-sec.-decyl- and N,N'-dicyclohexyl-, (p- or m-)phenylenediamine, N,N'-dimethyl-, N',-diethyl-, N,N'-diisopropyl-, N,N'-di-sec.-butyl-, N,N'-dicyclohexyl-, 4,4'-diamino-diphenylmethane, N,N'-di-sec.-butylbenzidine, methylene-bis(4-amino-3-benzoic acid methyl-ester), 2,4-chloro-4,4'-diamino-diphenylmethane, and 2,4- and 2,6-diaminotoluene.

The compounds of component d) may be used in the form of mixtures or individually. Mixtures of chain extenders and crosslinking agents may also be used.

In order to adjust the hardness of the PUR elastomers, synthesis components b), c) and d) may be varied within relatively wide quantitative ratios, wherein the hardness increases with increasing content of component d) in the reaction mixture.

In order to obtain a desired hardness of the material, the requisite amounts of synthesis components b), c) and d) may be determined experimentally in a simple manner. 1 to 50 parts by weight, preferably 3 to 20 parts by weight, of chain extenders and/or crosslinking agents d) are advantageously used with respect to 100 parts by weight of high molecular weight compounds b) and c).

Amine catalysts which are familiar to one skilled in the art may be used as component e), e.g. tertiary amines such as triethylamine, tributylamine, N-methylmorpholine, N-ethyl-morpholine, N,N,N',N'-tetramethyl-ethylenediamine, pentamethyldiethylene-triamine and higher homologues thereof (DE-OS 2624 527 and 26 24 528), 1,4-diaza-bicyclo-(2,2,2)-octane, N-methyl-N'-dimethylaminoethyl-piperazine, bis-(dimethylaminoalkyl)-piperazine, N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-β-phenylethylamine, bis-(dimethyl-aminopropyl)-urea, 1,2-dimethylimidazole, 2-methylimidazole, monocyclic and bicyclic amidines, bis-(dialkylamino)-alkyl ethers, as well as tertiary amines which contain amide groups (preferably formamide groups) according to DE-OS 25 23 633 and 2732 292. Suitable catalysts also include Mannich bases which are known in the art, comprising secondary amines such as dimethylamine, and aldehydes, preferably formaldehyde, or ketones such as acetone, methyl ethyl ketone or cyclohexanone, and phenols such as phenol, nonylphenol or bisphenol. Examples of tertiary amines which comprise active hydrogen atoms which are reactive towards isocyanate groups and which may be used as catalysts include triethanolamine, triisopropanolamine, N-methyl-diethanolamine, N-ethyl-diethanolamine, N,N- dimethylethanolamine, the reaction products thereof with alkylene oxides such as propylene oxide and/or ethylene oxide, as well as secondary-tertiary amines according to DE-OS 27 32 292. Silaamines comprising carbon-silicon bonds may also be used as catalysts, such as those which are described in U.S. Pat. No. 3,620,984, e.g. 2,2,4-trimethyl-2-silamorpholine and 1,3-diethyl-aminomethyl-tetramethyldisiloxane. Bases which contain nitrogen may also be used, such as tetraalkylammonium hydroxides, as may hexahydrotriazines. The reaction between NCO groups and Zerewitinoff-active hydrogen atoms is also considerably speeded up by lactams and azalactams. According to the invention, organic compounds of metals, particularly organic tin compounds, may be used in conjunction as additional catalysts. Apart from compounds which contain sulphur, such as di-n-octyltin mercaptide, the preferred organic tin compounds are tin(II) salts of carboxylic acids such as tin(II) acetate, tin(II) octoate, tin(II) ethylhexoate and tin(II)laurate, as well as tin(IV) compounds such as dibutyltin oxide, dibutyltin dichloride, dibutyltin diacetate, dibutyltin dilaurate, dibutyltin maleate or dioctyltin diacetate.

The catalysts or combinations of catalysts are generally used in an amount between about 0.001 and 10% by weight, particularly from 0.01 to 1% by weight, with respect to the total amount of compounds which contain at least two hydrogen atoms which are capable of reacting with isocyanates.

Esters of mono- or polybasic carboxylic acids are used as component f). The pK values, as determined in aqueous solution, of the (first) dissociation constant of these carboxylic acids generally range from 0.5 to 4, preferably from 1 to 3. Examples of suitable acid components include alkylmonocarboxylic acids such as formic acid, alkylpolycarboxylic acids, such as oxalic acid, malonic acid, maleic acid, fumaric acid and citric acid, arylmonocarboxylic acids such as α-naphthoic acid and arylpolycarboxylic acids, such as isomers and alkyl-substituted derivatives of phthalic acid, trimellitic acid, and pyromellitic acid, isomers of naphthalene-dicarboxylic acid, and cyclic double esters of α-hydroxycarboxylic acids such as mandelic acid or lactic acid. Saturated $C_2$–$C_4$ alkylpolycarboxylic acids are preferably used; oxalic acid is particularly preferred. Examples of suitable alcohol components include aliphatic mono- and polyols such as methanol, ethanol, propanol, iso-propanol, ethylene glycol, 1,2- and 1,3-propanediol, isomers of butanol, 2-butene-1,4-diol, 2-butyne-1,4-diol, neopentyl glycol, glycerol, trimethylolpropane and pentaerythritol. Examples of suitable aryl alcohols include phenol and substituted derivatives thereof, naphthol and alkyl-substituted derivatives thereof, hydroquinone, resorcinol, trihydroxybenzenes, and all the polyether and polyether ester polyols cited under c). Aliphatic monools are preferred, particularly methanol, ethanol, n- or i-propanol, or n-, i- or tert.-butanol.

Component f) is used for the production of the elastomers according to the invention in amounts such that the maximum ratio of the number of ester groups contained in component f) to the number of amino groups contained in component e) is 1.0. A ratio from 0.5 to 0.8 is preferably selected.

Solid PUR elastomers, e.g. PUR cast elastomers, may be produced by the method according to the invention in the absence of moisture and of physically or chemically-acting foaming agents.

Water is preferably used as the foaming agent g) for the production of cellular, preferably microcellular PUR elastomers. Water reacts in situ with organic polyisocyanates a) or with prepolymers which contain isocyanate groups, with the formation of carbon dioxide and amino groups which in turn react with further isocyanate groups to form urea groups and thereby act as chain extenders.

If water has to be added to the polyurethane formulation in order to achieve the desired density, it is usually added in amounts of 0.001 to 3.0% by weight, preferably 0.01 to 2.0% by weight, particularly 0.05 to 0.5% by weight, with respect to the weight of synthesis components a), b) and optionally c) and d).

Instead of or preferably in combination with water, it is possible to use gases or readily volatile inorganic or organic substances as foaming agents g). Said substances volatilize under the effect of the exothermic polyaddition reaction and advantageously have boiling points under normal pressure within the range from 40 to 120° C., preferably from 10 to 90° C. Examples of suitable organic foaming agents include acetone, ethyl acetate, halogen-substituted alkanes or perhalogenated alkanes such as (R134a, R141b, R65mfc, R245fa), as well as butane, pentane, cyclopentane, hexane cyclohexane, heptane or diethyl ether. Examples of suitable inorganic foaming agents include air, $CO_2$ and $N_2O$. A foam formation effect may also be achieved by the addition of compounds which decompose at temperatures above room temperature with the evolution of gases, for example nitrogen and/or carbon dioxide, such as azo compounds, e.g. azodicarbonamide or azoisobutyronitrile, or salts such as ammonium bicarbonate, ammonium carbamate or ammonium salts of organic carboxylic acids, e.g. monoammonium salts of malonic acid, boric acid, formic acid or acetic acid. Other examples of foaming agents, as well as details of the use of foaming agents are described by R. Vieweg and A. H öchtlen (Editors) in "Kunststoff-Handbuch", Volume VII, Carl-Hanser-Verlag, Munich, 3rd Edition, 1993, pages 115–118, 710–715.

The amount of solid foaming agents which is advantageously used, or the amount of low-boiling liquids or gases which may each be used individually or in the form of mixtures, e.g. as liquid or gas mixtures or as gas-liquid mixtures, depends on the sought-after density and on the amount of water used. The requisite amounts may easily be determined experimentally.

Satisfactory results are usually obtained by employing amounts of solids of 0.5 to 35% by weight, preferably 2 to 15% by weight, amounts of liquids of 0.5 to 30% by weight, preferably 0.8 to 18% by weight and/or amounts of gases of 0.01 to 80% by weight, preferably 10 to 50% by weight, with respect to the weight of synthesis components a), b), c) and optionally d) in each case. Gases, e.g. air, carbon dioxide, nitrogen and/or helium, may be introduced via the high molecular weight polyhydroxyl compounds b) and c), via the low molecular weight chain extenders and/or crosslinking agents d), via polyisocyanate a), or via a) and b) and optionally c) and d).

Additives h) may optionally be added to the reaction mixture for the production of solid and cellular PUR elastomers. Suitable examples thereof include surface-active additives such as emulsifiers, foam stabilisers, cell regulators; flame retardants, nucleating agents, antioxidants, stabilisers, internal lubricants and demoulding agents, colorants, dispersing agents and pigments. Examples of suitable emulsifiers include sodium salts of ricinolsulphonates or salts of fatty acids with amines such as diethylamine oleate or diethanolamine stearate. Alkali or ammonium salts of sulphonic acids such as dodecylbenzenesulphonic acid or dinaphthylmethanedisulphonic acid or of fatty acids such as ricinoleic acid or of polymeric fatty acids, for instance, may also be used in conjunction as surface-active additives. The preferred foam stabilisers are polyether siloxanes, particularly water-soluble representatives thereof. These compounds are generally synthesised by bonding a copolymer of ethylene oxide and propylene oxide to a polydimethylsiloxane radical. Foam stabilisers of this type are described in U.S. Pat. Nos. 2,834,748, 2,917,480 and 3,629,308 for example. Polysiloxane-polyoxyalkylene copolymers according to DE-OS 25 58 523, which are multiply-branched via allophanate groups, are of particular interest. Substances which are also suitable include other organopolysiloxanes, oxyethylated alkylphenols, oxyethylated fatty alcohols, paraffin oils, esters of castor oil or of ricinoleic acid, Turkey red oil, peanut oil, and cell regulators such as paraffins, fatty alcohols and polydimethylsiloxane. Moreover, oligomeric polyacrylates comprising polyoxyalkylene and fluoroalkane radicals as side groups are suitable for improving the emulsifying effect, the dispersion of the fillers, the cell structure and/or for the stabilization thereof. These surface-active substances are usually employed in amounts of 0.01 to 5 parts by weight with respect to 100 parts by weight of high molecular weight polyhydroxyl compounds b) and c). Substances which may also be added include reaction retarders, pigments or colorants, and flame retardants which are known in the art, as well as stabilisers which afford protection from the effects of aging and weathering, plasticisers, and substances which have a fungiostatic or bacteriostatic effect.

Further examples of surface-active additives and foam stabilisers which may be used in conjunction according to the invention, as well as cell regulators, reaction retarders, stabilisers, flame retardant substances, plasticisers, colorants and fillers, and substances which have a fungiostatic or bacteriostatic effect, together with details of the manner of use and the mode of action thereof, are described by R. Vieweg and A. Höchtlen (Editors) in the "Kunststoff-Handbuch", Volume VII, Carl-Hanser-Verlag, Munich, 3rd Edition, 1993, pages 118–124.

For the production of the PUR elastomers according to the invention, the components are reacted in amounts such that the equivalent ratio of NCO groups of polyisocyanate a) to the sum of the hydrogen atoms of components b), c), d) which react with NCO and of the chemically-acting foaming agents which are optionally used ranges from 0.8:1 to 1.2:1, preferably from 0.95:1 to 1.15:1, particularly from 1.00:1 to 1.05:1.

The PUR materials according to the invention may be produced by methods described in the literature, e.g. by the one-shot or prepolymer methods, with the aid of mixing apparatuses known in principle to one skilled in the art. They are preferably produced by the prepolymer method.

In one embodiment of the production of the PUR materials according to the invention, the starting components are homogeneously mixed in the absence of foaming agents g), usually at a temperature of 20 to 80° C., preferably of 25 to 60° C., and the reaction mixture is introduced into an open forming tool, which is optionally heated, and is allowed to cure. In a further production variant for the PUR elastomers according to the invention, the synthesis components are mixed in the same manner in the presence of foaming agents g), preferably water, and are introduced into the forming tool, which is optionally heated. After it has been filled, the forming tool is closed and the reaction mixture is allowed to foam to form a foamed body. This process is accompanied by densification, e.g. a degree of densification (ratio of the density of the foamed body to the density of the free foam) of 1.05 to 8, preferably 1.1 to 6, particularly 1.2 to 4. As soon as the foamed body possesses an adequate strength, it is demoulded. Amongst other factors, the demoulding time depends on the temperature and geometry of the forming tool and on the reactivity of the reaction mixture, and usually ranges from 2 to 15 minutes.

Depending on the type and content of fillers, amongst other factors, solid PUR elastomers according to the invention have a density of 0.8 to 1.4 g/cm$^3$, preferably 1.0 to 1.25 g/cm$^3$. Cellular PUR elastomers according to the invention have densities of 0.2 to 1.4 g/cm$^3$, preferably 0.30 to 0.8 g/cm$^3$.

Polyurethane plastics of this type constitute particularly valuable raw materials for industrial articles which are usually exposed to weathering and moisture, such as rollers and elastic elements, as well as shoe soles of single- or multi-layer construction.

EXAMPLES

In order to produce polyurethane test pieces, the A component (at 45° C.) was mixed in a low pressure foam installation (NDI) with the B component (at 45° C.) at a ratio by weight of the A component to the B component of 100:60, the mixture was cast into an aluminum folding mould (of size 200 by 140 by 5 mm) which was heated to 50° C., the folding mould was closed, and the elastomer was demoulded after 3 minutes.

Using a punching tool, shaped, necked bars (type: Bar I [ISO Standard 37 Type I]) were punched as test pieces out of the elastomer slabs which were thus obtained, after the latter had been stored for 24 hours. Before the commencement of the aging tests, the initial values of the tensile strength of three test pieces were determined according to the aforementioned Standard. Thereafter, the test pieces were subjected to an aging test at 70° C. and 100% relative humidity. Samples were taken at regular intervals of 2–5 days, at which intervals three test pieces were removed from the test chamber, were reconditioned at 25° C. for 24 hours, and the tensile strength thereof was then measured according to DIN 53504. The results are given in Table 2.

Examples 1–5

A component
100 parts of a mixture comprising:

| | |
|---|---|
| 80.7% by weight | 1,4-butanediol-ethylene glycol polyadipate (ratio 14.1:20.5:65.4) with a number average molecular weight of 2000 g/mol |
| 4.7% by weight | trimethylolpropane-ethylene glycol polyadipate (ratio 3.2:41.1:55.7) with a number average molecular weight of 2400 g/mol |
| 0.3% by weight | triethanolamine |
| 5.0% by weight | ethylene glycol |
| 0.1% by weight | water |
| 0.9% by weight | amine catalyst diaza-bicyclo-[2.2.2]-octane |
| 8.3% by weight | antistatic agent, release agent and emulsifier |

B component
60 parts of a prepolymer with an NCO content of 19%, obtained by the reaction of:

| | |
|---|---|
| 56% by weight | 4,4'-MDI |
| 6% by weight | carbodiimide-modified MDI comprising 29.8% by weight NCO, functionality 2.1 (Desmodur ® CD, Bayer AG) |
| 38% by weight | ethanediol-diethylene glycol polyadipate (ratio 14.3:24.4:61.3) with a number average molecular weight of 2000 g/mol. |

The amounts of diethyl oxalate added to the B component are indicated in Table 1 as "parts by weight".

TABLE 1

| Example | Compound in B | Parts by weight | Ratio of ester groups to amino groups |
|---|---|---|---|
| 1 | diethyl oxalate | 0.6 | 0.5:1 |
| 2 | diethyl oxalate | 1.2 | 1.0:1 |
| 3 comparative | diethyl oxalate | 1.7 | 1.5:1 |
| 4 comparative | diethyl oxalate | 2.3 | 2.0:1 |
| 5 comparative | diethyl oxalate | 2.9 | 2.5:1 |

TABLE 2

| Example | Residual tensile strength as a percentage of the initial value after aging for a number of days at 70° C. and 100% rel. atmos. humidity | | | | |
|---|---|---|---|---|---|
| Days | 0 | 3 | 6 | 9 | 13 |
| Without additives | 100.0 | 60.1 | 27.1 | 10.1 | 0.0 |
| 1 | 100.0 | 107.6 | 87.1 | 62.4 | 27.1 |
| 2 | 100.0 | 84.8 | 67.1 | 61.0 | 22.6 |
| 3 comparative | 100.0 | 80.9 | 46.3 | 28.4 | 9.9 |
| 4 comparative | 100.0 | 97.6 | 49.4 | 25.9 | 8.8 |
| 5 comparative | 100.0 | 84.7 | 43.9 | 16.6 | 6.4 |

What is claimed is:

1. A polyurethane elastomer comprising the product of the reaction of:

a) at least one member selected from the group consisting of diisocyanate and polyisocyanate;

b) at least one polyester polyol having an OH number of 20 to 280 and a functionality of 1.8 to 2.4, and optionally;

c) at least one member selected from the group consisting of polyether polyol and polyether ester polyol, each having an OH number of 10 to 149 and a functionality of 2 to 8; and d) optionally at least one member selected from the group consisting of
   (i) chain extenders having molecular weights lower than 800, and (ii) crosslinking agents having OH numbers of 150 to 1870, in the presence of e) at least one amine catalyst, f) at least one member selected from the group consisting of (i) an ester of a monobasic carboxylic acid, and (ii) an ester of a polybasic carboxylic acid, the (first) dissociation constant (pK) of each being 0.5 to 4, said ester of said polybasic carboxylic acid (ii) containing a residue of a polybasic carboxylic acid selected from the group consisting of oxalic acid, malonic acid, maleic acid, fumaric acid, citric acid, phthalic acid, trimellitic acid and pyromellitic acid, and said ester of said polybasic carboxylic acid (ii) containing at least one residue of an alcohol selected from the group consisting of methanol, ethanol n-propanol, iso-propanol, n-butanol, iso-butanol, tert.-butanol and phenol, g) optionally a foaming agent, and h) optionally at least one additive selected from the group consisting of emulsifiers, foam stabilizers, cell-size regulators, flame retardants, nucleating agents, antioxidants, internal lubricants, demolding agents, colorants, dispersing agents, pigments, reaction retarders, aging stabilizers, plasticizers, fungicides and antibacteria agents, wherein the maximum ratio of the number of ester groups of f) to the number of amino groups of e) is 1.0.

2. The polyurethane elastomer of claim 1 wherein a) is a prepolymeric reaction product of 4,4'-diphenylmethane diisocyanate and polyester polyol.

3. A molded article comprising the polyurethane elastomer of claim 1.

4. A method comprising:

(i) providing a reaction mixture according to claim 1; and (ii) producing, from said reaction mixture, a molded article selected from the group consisting of a roller, an elastic element and a shoe sole.

5. The polyurethane elastomer of claim 1 wherein said ester of said monobasic carboxylic acid (i) contains a residue of a monobasic carboxylic acid selected from the group consisting of formic acid and α-naphthoic acid, and said ester of said monobasic carboxylic acid (i) contains a residue of an alcohol selected from the group consisting of methanol, ethanol, n-propanol, iso-propanol, n-butanol, iso-butanol, tert.-butanol and phenol.

6. The polyurethane elastomer of claim 1 wherein said ester of said monobasic carboxylic acid (i) contains at least one residue of an alcohol selected from the group consisting of methanol, ethanol, n-propanol, iso-propanol, n-butanol, iso-butanol and tert.-butanol.

7. The polyurethane elastomer of claim 6 wherein the polybasic carboxylic acid of said ester of said polybasic carboxylic acid (ii) is oxalic acid.

8. The polyurethane elastomer of claim 1 wherein the ratio of the number of ester groups of f) to the number of amino groups of e) is from 0.5 to 0.8.

* * * * *